United States Patent Office 3,549,538
Patented Dec. 22, 1970

3,549,538
SCALE INHIBITION AND REMOVAL IN STEAM GENERATION
Clarence Jacklin, Downers Grove, Ill., assignor to Nalco Chemical Company, Chicago, Ill., a corporation of Delaware
No Drawing. Filed June 22, 1967, Ser. No. 647,920
Int. Cl. C02b 5/06
U.S. Cl. 252—82
16 Claims

ABSTRACT OF THE DISCLOSURE

This invention is directed to a method of inhibiting and removing scale which forms in boilers used to generate steam at a variety of pressures. The invention contemplates treating such boilers with a composition comprising two components.

The first component is (A) a nitrilo compound having the structural formula $$N(-(CH_2-)_x-Q)_3$$

where $x$ is an integer of from 1-2 and Q is either the

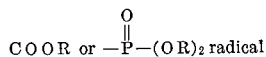

In this formula R may be either hydrogen alkali metal and ammonium with at least 2 occurrences of R being alkali metal or ammonium:

The second component is (B) a water soluble sulfoxy free polar addition polymer having a molecular weight of at least 1,000.

The invention is particularly directed to the use of nitrilo tricarboxylic acid salts in combination with anionic vinyl carboxylate containing polymers for treating industrial boilers to prevent the formation of scale and in certain cases aiding in the removal of existing deposits.

THE PRIOR ART

Boilers used to generate steam have been treated with a variety of synthetic and naturally occurring chemicals in an effort to reduce the formation of scale on heat exchange surfaces. Scale, when of a sufficient thickness, tends to reduce heat transfer and in some instances produces metal overheating. When these problems are aggravated by large scale accumulation, rupture of the heat exchange surfaces can occur causing possible injury and requiring extended down-time for repairs.

One approach to preventing the formation of scale in boilers has been the treatment of boiler water with small amounts of polar water soluble polymers. One of the earliest and most successful groups of polar polymers used in treating boilers to prevent scale are the maleic anhydride co-polymers described in Johnson U.S. 2,723,956. This patent discloses a wide variety of vinyl addition polymers of maleic anhydride with other mono-ethylenically unsaturated comonomers.

One of the preferred copolymers described in the Johnson patent is a maleic anhydride-styrene copolymer prepared by reacting at least one mole of maleic anhydride with one mole of styrene. As will be shown hereinafter, polymers of this type are effective in preventing scale under a wide variety of operating pressures and in the presence of many different type waters.

The next improvement in the art, based on the teachings of Johnson U.S. 2,723,956, is found in the disclosure of Crum et al. U.S. 2,783,200. These patentees substantiate the teachings of Johnson in that they disclose a specific class of anionic acrylic polymers which are either acrylate polymers or acrylic copolymers. The patent further discloses the concept that the polymers are effective in combination with the well-known phosphates and conventional naturally occurring organics such as lignins. While the teachings of Crum et al. do not extend the basic scope of the Johnson patent it tends to emphasize the value to the art of utilizing anionic water soluble polymers.

A further advance in the art of polymeric boiler treating composition is found in Ruehrwein U.S. 2,980,610 wherein it is shown that polypolar polymers such as polyacrylamide and polyvinyl alcohol are effective in preventing boiler scale.

Shortly after such polymers were disclosed as being useful for preventing scale in boilers it was reported that amino carboxylic acid type chelating agents were also effective in preventing or mitigating scale formation. Illustrative of such materials are the well-known ethylene diamine tetraacetic acids and salts. While showing promise in combating scale problems these amino carboxylic acid compounds evidenced certain limitations which render them somewhat restricted for industrial applications. Specifically, it was found that these materials were not effective at higher pressures and in those cases where the boiler waters contained large amounts of hardness producing dissolved solids the quantity of chelating agent necessary to prevent scale formation was economically excessive.

A recent discovery in the area of synthetic organic chemicals for treating boiler waters to prevent scale formation is found in the disclosures of Jacklin U.S. 3,296,027. The basic teachings of this patent reside in the discovery that nitrilo carboxylates are effective in preventing the formation of scale commonly formed in boilers under normal operating conditions.

The nitrilo carboxylic acid compounds of Jacklin U.S. 3,296,027 overcome many of the deficiencies when ethylene diamine tetracarboxylic acid compounds are used. Among others, the major advantage of nitrilo tricarboxylic acid compounds resides in their ability to more effectively prevent scale formation at lower dosages.

While the use of polymeric boiler additives and nitrilo tricarboxylic acid compounds have greatly advanced the state of the art of boiler water treatments there is still room for improving the overall capabilities of these materials.

In many cases it would be desirable to extend the existing pressure limitations imposed upon the nitrilo carboxylic acid compounds. Also, it would be of great benefit to provide boiler treating compositions capable of effectively controlling scale under a wide variety of water conditions and pressures with the amount of all such compositions being of a small order of magnitude.

Of further benefit would be the provision of boiler treating compositions capable of not only inhibiting scale but which, over prolonged periods of use, would tend to reduce and in some cases remove any existing scale present in a boiler. A related long sought-after advance in the art is a boiler scale inhibiting composition which could be used in conjunction with inorganic phosphates which would react with any calcium phosphate formed by the use of phosphate treatments. Also of benefit would be materials effective in preventing the deposition of such difficultly removed scale exemplified by the oxides of iron and the alkaline earth metal silicates.

Not oinily should an improved boiler treatment be compatible with other existing treatments but it should be capable of controlling scale by itself and operate at extremely low dosages not related to the stoichiometry of the particular water involved. Another important characteristic of any improved scale inhibiting composition is that it should be capable of operating upon boiler waters containing both small and large amounts of hardness. Also a preferred treatment should not induce foaming or priming even though occasionally used in large quantities.

OBJECTS OF THE INVENTION

It therefore becomes an object of the invention to provide a new and improved boiler treating composition which is effective at extremely low dosages and operates under a variety of scale forming conditions and boiler pressures.

Another object o fthe invention is to provide an improved boiler composition which prevents deposit of such scales as calcium phosphate, magnesium phosphate, iron oxides and the alkaline earth metal silicates.

A further object of the invention is to provide an improved boiler composition which works in the presence of other boiler treating compounds, particularly the inorganic phosphates and yet is capable of operating effectively to prevent scale formation without other treating agents being present.

Still another objective is to provide a boiler treating composition capable of inhibiting scale formation under conditions of low feed water hardness.

Yet, another object is to provide a boiler treating composition which does not cause forming or priming to occur.

Other objects will appear hereafter.

THE INVENTION

As indicated, the invention is directed to a method of inhibiting and removing scale which forms in boilers used to generate steam at a variety of pressures. The invention uses a two-component composition comprising:

(A) A nitrilo compound having the structural formula of $$N(\text{---}(CH_2\text{---})_x\text{---}Q)_3$$

where $x$ is an integer of from 1–2 and Q is either the radical

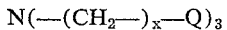

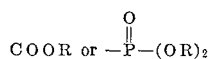

R is either hydrogen alkali metal or ammonium. Preferably at least 2 occurrences of R are alkali metal or ammonium, and (B) A sulfoxy-free polar addition polymer having a molecular weight of at least 1,000.

The nitrilo compound and the polar addition polymer are combined to form a boiler treating composition which contains from 10–90% by weight of the nitrilo compound and from 90–10% by weight of the sulfoxy-free polar addition polymer. Listed below are the overall composition ranges:

| General: | Percent by weight |
|---|---|
| Nitrilo compound | 10–90 |
| Polar polymer | 90–10 |
| Preferred: | |
| Nitrilo compound | 20–80 |
| Polar polymer | 80–20 |
| Most preferred: | |
| Nitrilo compound | 30–70 |
| Polar polymer | 70–30 |

The above compositions may be employed at dosage levels ranging between 0.1–1,000 p.p.m. with dosages varying between 1–100 p.p.m. affording adequate scale prevention in most instances. Excellent results are often achieved by the use of from 5–50 parts per million.

To maximize the effectiveness of the compositions, it is desirable that the boiler be operated at a pH range of between 10–12 and preferably 10.5–11.5.

It is beneficial that sufficient alkalinity be present to prevent calcium sulfate deposition at a given temperature and pressure. Thus, for example, 100 p.p.m. of alkalinity at a pressure of 900 p.s.i. would be an optional minimal desirable alkalinity concentration at which a boiler should operate.

The compositions of the invention are capable of preventing scale over a wide range of pressures ranging between 15–2000 p.s.i. Excellent results are achieved when the compositions are used to treat boilers operating within the pressure range of 15–1500 p.s.i.

Before considering the more specific characteristics and operational features of the invention, it is well to consider the chemical composition of the nitrilo compound and the water soluble polar polymers.

THE NITRILO COMPOUNDS

As indicated above, the nitrilo compounds are selected from either the nitrilo carboxylates or the nitrilo phosphonates. These compounds are used in a preferred embodiment of the invention in the form of their alkali metal or ammonium salt. Illustrative of such compounds are the trisodium salts of nitrilotriacetic acid and nitrilotrimethylenephosphonic acid. Since much of the invention to be hereinafter illustrated will be with particular reference to nitrilotriacetic acid and its trisodium salt this patricular compound will be referred to for purposes of simplification as NTA.

THE WATER SOLUBLE SULFOXY-FREE POLAR ADDITION POLYMERS

These polymers encompass a large group of water soluble polymeric compounds. As indicated, these polymers should have a molecular weight of at least 1,000. As will be shown in some detail, the molecular weight of these polymers is not deemed critical to the success of the invention. It has been discovered that polymers having low, intermediate or high molecular weights all produce satisfactory results when used in the practice of this invention. When used herein the expression "low molecular weight," encompass polymers having a molecular weight range of from 1,000–40,000. Intermediate molecular weight polymers may be arbitrarily described as having molecular weights within the range of 40,000–500,000. High molecular weight polymers encompass all polymers having molecular weights greater than 500,000 and in some instances may be in excess of several million.

A particularly effective class of water soluble sulfoxy-free polar addition polymers have as a part of their molecular configuration at least 5% by weight of side chain groups which will be either anionic or which under conditions of alkaline hydrolysis are capable of being converted into anionic functional groups.

These anionic polymers desirably contain as a functional side-chain group, carboxylic acid groups, carboxylic anhydride groups, carboxylic salt groups, carboxylic acid ester groups or carboxylic acid amide groups. As indicated, in the case of the esters and amides, under normal alkaline boiler conditions these materials hydrolize to the alkali metal or alkaline earth metal salt form. The preferred water soluble anionic polymers are those described in Johnson U.S. 2,723,956. The disclosure of this patent is incorporated herein by reference. The maleic anhydride copolymers of the Johnson patent are extremely effective when combined with NTA in providing improved boiler treating compositions.

The most beneficial maleic anhydride copolymer from cost performance standpoint are the copolymers prepared by reacting at least one mole of maleic anhydride with one mole of styrene. Low, intermediate and high molecular weight polymers of this maleic anhydride species are valuable ingredients used in formulating compositions of this invention.

Another preferred group of anionic water soluble polymers are the acrylic acid polymers which may be prepared by the homo or copolymerization of acrylic acid or its salts. In a preferred embodiment of the invention it is desirable to use acrylic acid or acrylic acid salt-acrylamide copolymers prepared by the alkaline hydrolysis of a pre-formed polyacrylonitrile.

To illustrate the hydrolysis of preferred maleic anhydride styrene copolymers, the following is presented by way of an example:

Example I

Typical charge weights for a 100 gallon reactor:

| | Lbs. |
|---|---|
| Soft water (less than 0.1 grains hardness per gallon) | 334.5 |
| Styrene-maleic anhydride resin (Acid No.=497) | 51.5 |
| 50% sodium hydroxide | 39.0 |
| Total | 425.0 |

*Procedure.*—The soft water was metered into the reactor. Then the styrene-maleic anhydride resin was charged through the manway, while the agitator was set at low speed, 250 r.p.m. The charging of the resin required the use of dust masks, face shields, and static lines since the resin powdered quite easily. On a large scale, bagged material may facilitate the charging of the resin; otherwise the suggested safety procedures would have to be employed.

After the resin was charged to the reactor, the manway was sealed and the slurry was heated with steam to 185° F. Next, the reactor jacket was vented and set up for the application of cooling water. Then the 50% sodium hydroxide was added to the slurry over a minimum period of ten minutes at a rate entirely determined by the exothermicity of the hydrolysis. After the caustic was added to the slurry, the reaction mixture was heated with steam at 10 p.s.i.g. to 212° F.

Excessive foaming was experienced during the initial stages of the heatup period and distillation, but the foam layer eventually subsided during the course of the steam distillation. The distillation conditions were maintained until approximately 52 lbs. or 6 gallons of condensate were collected. Then, the reaction mixture was cooled to 185° F. and maintained at 185±10° F. for ninety minutes to complete the hydrolysis step.

After the completion of the hydrolysis step, the steam was turned off and cooling water was applied to the reactor jacket to cool the batch from 185° F. to 125° F. An amount of soft water equivalent to the amount of waer condensate collected during the water distillation was added to the reaction mixture.

Finally, the batch was filtered through a horizontal leaf filter to remove the turbid material and precipitate caused by the presence of iron and organics. The filter was precoated at 0.0825 lb./ft.² of filtering area with Hi Flo Super Cel filter aid (R-641) in tap water. Then the batch was recyled through the filter at 150 lbs./minute until visually clear.

In the above example it is noted that the product has been subject to alkaline hydrolysis thereby placing the carboxylate portion of the polymer in the sodium form. The particular polymer had an average molecular weight of 50,000.

Another group of useful sulfoxy free polar polymers are those prepared by the alkaline hydrolysis of polyacrylo nitriles. Polymers of this class are readily prepared as illustrated by the following example:

Example II

This example shows a suitable process for preparing polyacrylonitrile. The ingredients that were used in the process include the following:

| Ingredient: | Parts (by weight) |
|---|---|
| Acrylonitrile | 14.7 |
| Water (deionized) | 51.0 |
| 10% ammonium persulfate solution | 6.9 |
| 10% sodium bisulfite solution | 27.4 |
| Total | 100.0 |

The acrylonitrile and water were mixed together in a flask equipped with an agitator, thermometer, and condenser and warmed to 50° C. The ammonium persulfate solution was added to the mixture and two minutes later the sodium bisulfite solution was added. Initiation of polymerization occurred almost immediately. The temperature, which had dropped to 45° C., was allowed to rise 1.5–2.0 degrees/min. up to 64° C. with partial cooling. The reaction mixture was then cooled and maintained at 55° C. for 3½ hours. The solution was then heated to 80° C. for one-half hour under slight vacuum to remove traces of unreacted acrylonitrile.

There are several methods that can be used to hydrolyze the polyacrylonitrile. Probably the best method is to hydrolyze the polyacryonitrile slurry with sodium hydroxide in an aqueous medium. One of the problems involved in this procedure is due to the high viscosity level that is reached during the initial stage of the hydrolysis. In order to avoid this difficulty, the polyacrylonitrile can be added to the hydrolyzing medium over a 50–90 minute period. In an illustrative hydrolysis treatment, 24.4 parts of weight of a 50% NaOH solution was placed in a clean reaction vessel equipped with a stirrer, thermometer, and reflux condenser and heated to 90° C. One hundred (100) parts by weight of a 14.7% polyacrylonitrile slurry in water was then fed continuously to the reaction vessel over a 50 minute period. After the last portion of polyacrylonitrile was added, the reaction was heated at 90–100° C. At regular intervals, samples were withdrawn, cooled rapidly to room temperature, and submitted for evaluation. Optimum properties were obtained with material that was hydrolyzed for 2.5–5.0 hours. Length of hydrolysis is dependent on temperature. Analysis by infrared indicated that the best products were composed of 20–30% amide and 70–80% carboxyl groups. The same is true where the dispersant is prepared by a copolymerization reaction such as by the copolymerization of acrylic acid and acrylamide.

Table 1 following, shows the reaction conditions used in preparing polyacryonitriles of various molecular weights.

TABLE 1.—SYNTHESIS OF POLYACRYLONITRILES OF VARIOUS MOLECULAR WEIGHTS

| | Ingredients (by weight) | | | | Reaction conditions | | Intrinsic viscosity | Molecular weight |
|---|---|---|---|---|---|---|---|---|
| | ACN | H₂O | (NH₄)₂S₂O₈ | Na₂S₂O₅ | Temp., °C. | Time, hours | | |
| Product No.: | | | | | | | | |
| 1 | 265 | 1,120 | 1.4 | 5.5 | 50–55 | 2 | 4.50 | 490,000 |
| 2 | 265 | 1,220 | 3.45 | 13.8 | 50–55 | 2 | 1.83 | 148,000 |
| 3 | 265 | 1,680 | 13.8 | 55.2 | 50–55 | 3.5 | | |
| 4 | 265 | 1,680 | 13.8 | 55.2 | 50–55 | 4 | 0.40 | 19,500 |
| 5 | 265 | 1,680 | 13.8 | 55.2 | 50–55 | 3 | 0.385 | 18,500 |
| 6 | 265 | 1,680 | 13.8 | 55.2 | 55 | 3.5 | 0.378 | 18,000 |
| 7 | 265 | 1,680 | 13.8 | 55.2 | 70–90 | 1.5 | 0.297 | 13,000 |

The mol ratio of caustic to acrylonitrile that is used in the hydrolysis is important in determining the extent and rate of hydrolysis. Table 2 shows the composition of products hydrolyzed for 17 to 19 hours using less than the theoretical amount of sodium hydroxide.

TABLE 2.—EFFECT OF CAUSTIC CONCENTRATION ON HYDROLYSIS OF POLYACRYLONITRILE

| | Mols NaOH per mol acrylonitrile | Hydrolysis time, hrs. | Composition | | |
|---|---|---|---|---|---|
| | | | CN | CONH$_2$ | CO$_2$H |
| 1 | 0.3 | 19 | 12 | 30 | 58 |
| 2 | 0.5 | 17 | 3 | 30 | 67 |
| 3 | 0.6 | 17 | | 32 | 68 |
| 4 | 0.7 | 17 | | 32 | 68 |
| 5 | 0.8 | 17 | | | |
| 6 | 0.9 | 17 | | 29 | 71 |

In addition to the specifically described polymers discussed above, a variety of other well-known polymeric materials may be used. For purposes of illustration, the following polymers are presented below:

| Name | Characteristic grouping |
|---|---|
| Polyacrylate sodium salt | $-CH_2-CH-$ with $COO(-)Na(+)$ |
| Polymethacrylic acid copolymer sodium salt | $-CH_2-C(CH_3)-$ with $COO(-)Na(+)$ |
| Maleic anhydride-vinyl acetate | $-CH---CH_2-CH---CH-$ with $CH_3C=O$, $O$, and $C-O-C=O$ anhydride ring |
| Polyvinyl methyl ether-maleic anhydride | $-CH---CH_2-CH---CH-$ with $OCH_3$ and $C-O-C=O$ anhydride ring |
| Methacrylic acid-acrylamide | $-CH_2C(CH_3)---CH_2---C(CH_3)-$ with $COO(-)H(+)$ and $CONH_2$ |
| Isopropenyl acetate-maleic anhydride sodium salt | $-CH_2-C(CH_3)(O-C(=O)CH_3)------CH(C=O, O(-)Na(+))-----------CH(C=O, O(-)Na(+))-$ |
| Itaconic acid-vinyl acetate | $-C(COO(-)H(+))(CH_2COO(-)H(+))-CH--------CH_2-CH(O-C(=O)CH_3)-$ |
| –methyl styrene-maleic acid sodium salt | $-C(CH_3)(C_6H_5)---CH_2---CH(COO(-)Na(+))---------------CH(COO(-)Na(+))-$ |
| Polyvinyl pyrrolidone | $-CH(N(CH_2CH_2C(=O))ring)---CH_2-$ |
| Polyvinyl alcohol | $-CH(OH)---CH_2-$ |
| Polyvinyl methyl ether | $-CH(OCH_3)---CH_2-$ |
| Polymaleic acid [1] | $-CH(COO(+))--------CH(COO(+))-$ |
| Methylmethacrylate-maleic acid sodium salt | $-C(CH_3)(COOCH_3)---CH_2---CH(COO(-)Na(+))---------------CH(COO(-)Na(+))-$ |
| Polyvinyl acetate | $-CH(O-C(=O)CH_3)---CH_2-$ |

[1] See Lang et al., "Homopolymerization of Maleic Anhydride" Journal of Polymer Science Vol. 1, pp. 1123–1136 (1963).

Any of the sulfoxy free non-cationic polyelectrolytes disclosed in U.S. Pat. No. 2,625,529 can be employed for the purpose of the invention. Where the copolymers are identified in terms of their monomeric constituents, it should be understood that the names applied to these copolymers refer to the molecular structure and are not limited to the polymers prepared by the copolymerization of specific monomers. In many cases, the identical copolymers can be prepared from other monomers and converted by subsequent chemical reaction to the desired copolymer.

The foregoing synthetic copolymers are preferably obtained by reacting equimolar proportions of a polycarboxylic acid derivative and at least one other monomer. However, certain of the hydrophilic derivatives of unsaturated polycarboxylic acids can be polymerized in less than equimolar proportions with some of the less hydrophobic comonomers, for example, vinyl formate and vinyl acetate.

EVALUATION OF THE INVENTION

The test equipment used in the following test runs consists of an inclined tube experimental boiler with natural thermal circulation. Volume at normal operating level was 0.56 gallon. The water level itself was automatically controlled by 3 insulated electrodes which made contact with the boiler water to operate relays which controlled the feedwater pump and heating element. Pressure control was by manual adjustment of a needle valve in the condensed steam line. Boiler test specimens were low carbon steel tubes, 1½" O.D. x 10" long, closed at one end and flanged at the other. The tubes were bolted in the boiler at an angle of 30° from the horizontal with the closed end down. Heat was applied to the inside and water surrounded the outside. A soft corrugated copper gasket was used to seal the tube in the boiler. The test surface itself was cleaned and polished with No. 3/0 emery paper before each test. Tests were run in absence of chemical (blank) and in a comparative manner with varying dosages of test chemical. Percent scale prevention was then calculated by measuring deposition of scale upon the test specimen with benefit of chemical boiler additive, while using the blank run as a basic of comparison and a base of 0% reduction.

The feedwater contained 6 p.p.m. calcium, 6 p.p.m. magnesium, 3 p.p.m. iron plus sodium hydroxide, sodium sulfite, and orthophosphate to give a boiler water total alkalinity of 300–350 p.p.m., $SO_3$ of 30–60 p.p.m. and $PO_4$ of 25–35 p.p.m. at 10 concentrations and 900 p.s.i.

The preconcentrated boiler fill procedure described above was used for the 900 p.s.i. tests included in this report, but it was not used for the 125 p.s.i. and 250 p.s.i. tests. For these, the regular feedwater was allowed to concentrate up to 10 concentrations in the boiler before the blowdown was turned on.

To illustrate the fact that molecular weight has little effect upon the activity of the sulfoxy-free polar polymers, the following tests (unless otherwise specified) were run in a laboratory experimental boiler at 900 p.s.i.

The results of these tests are presented below in Table 3.

TABLE 3.—STYRENE-MALEIC ANHYDRIDE COPOLYMER (SMA) FOR SCALE PREVENTION

| Molecular Weight: | Dosage, p.p.m. | Percent scale prevention |
|---|---|---|
| 50,000 | 4 | 70 |
| 10,000 | 4 | 70 |
| 10,000 | 8 | 70 |
| 10,000 | 16 | 75 |

From the above it can be seen that molecular weight does not materially increase or affect the performance of the styrene-maleic anhydride copolymers. It also should be noted that only slight improvements are obtained when the dosage is increased from 4–16 p.p.m.

Table 4 presented below illustrates the fact that maleic anhydride copolymers show effectiveness under pressure ranges varying between 900–1500 p.s.i. Also included in Table 4 are hydrolyzed polyacrylonitrile polymers prepared in accordance with Example II and a terpolymer of acrylamide, methacrylic acid and maleic anhydride, which polymer has an average molecular weight of approximately 2,000,000:

TABLE 4.—EFFECT OF HIGH PRESSURE ON SCALE PREVENTION

| Material: | Amount, p.p.m. | Percent scale prevention | | |
|---|---|---|---|---|
| | | 900 p.s.i. | 1,200 p.s.i. | 1,500 p.s.i. |
| Blank | | 0 | 0 | 0 |
| H-Pan [1] | 4 | 65 | | 55 |
| H-Pan | 16 | | 70 | 65 |
| SMA [2] | 4 | 70 | | 70 |
| SMA | 16 | 75 | 65 | 65 |
| Terpolymer [3] | 4 | 60 | | |
| Terpolymer | 16 | 75 | | 65 |

[1] Hydrolized polyacrylonitrile as per Example II.
[2] Styrene maleic anhydride as per Example I.
[3] Terpolymer of acrylamide 92%; methacrylic acid 7%; maleic anhydride 1%.

The above table shows that little change in activity is noted at pressures ranging from 900–1500 p.s.i. Results are shown in Table 5 for the hydrolyzed acrylonitrile and styrene maleic anhydride polymers at pressures of 125 and 250 p.s.i.

TABLE 5.—EFFECT OF LOW PRESSURE ON SCALE PREVENTION ACTION

| Material: | Amount, p.p.m. | Percent scale prevention | |
|---|---|---|---|
| | | 125 p.s.i. | 250 p.s.i. |
| Blank | | | |
| H-Pan | 0.5 | 50 | 40 |
| Do | 1.25 | | 65 |
| Do | 2.5 | | 75 |
| Do | 3.75 | 85 | 85 |
| SMA | 1.4 | 60 | |
| SMA | 2.9 | 90 | |

The anionic polymers used in the practice of the invention are preferably used in a salt form. Such forms may be illustrated by the sodium, ammonium or amine carboxylate forms. Illustrative of the fact that the salt form is effective, Table 6 is presented below:

TABLE 6

| Material | Amount, p.p.m. | Percent scale prevention |
|---|---|---|
| SMA $NH_3$ salt | 4 | 70 |
| SMA morpholine salt | 4 | 75 |

The use of the amine or ammonium salt is useful when it is desired to impart some corrosion inhibiting properties to finished formulations of the invention.

For purposes of illustrating the activity of the nitrilo compound, NTA was used as a test material. This test whose results appear below in Table 7 illustrates that at 5 and 20 p.p.m. scale inhibiting action occurs but is not entirely satisfactory.

TABLE 7.—ACTION OF NTA

| Material: | Amount, p.p.m. | Percent scale prevention |
|---|---|---|
| Blank | | 0 |
| NTA ($Na_3$) | 5 | 55 |
| NTA ($Na_3$) | 5 | 55 |
| NTA ($Na_3$) | 20 | 60 |

The results so far presented have shown that both the sulfoxy-free polar polymers and the nitrilo compounds have activity in preventing boiler scale under a wide variety of conditions. The data thus presented show that while scale prevention is achieved to a degree, it still could be improved. To illustrate the efficacy of combining the two components to achieve optimum scale prevention efficiency, Table 8 is presented below.

TABLE 8.—EFFECT OF POLYMER PLUS NITRILO COMPOUND

| Material | Amount, p.p.m. | Percent scale prevention |
|---|---|---|
| 85% NTA (Na₃) 15% terpolymer [1] | 6 | 65 |
| 85% NTA (Na₃) 15% terpolymer | 12 | 85 |
| Do | 20 | 90 |
| 85% 761[2], 15% SMA | 6 | 75 |
| 85% 761, 15% SMA | 12 | 85 |
| 53% 761, 47% SMA | 9.5 | 85 |

[1] See Table 4.
[2] 761 is a modification of NTA (Na₃) wherein 1% of an antifoam is added.

To further illustrate the various operative ratios of anionic polar polymer in combination with NTA which are effective scale preventatives, Table 9 is presented below. This table also shows that within the range of 10–90% to 90–10% of either ingredient exceptionally good results are obtained. This test was run without phosphate in the makeup water used in the boiler.

The feed water had the following makeup:

|  | P.p.m. |
|---|---|
| Ca | 3 |
| Mg | 3 |
| Fe | 1.5 |
| SiO₂ | 3 |
| PO₄ | 0 |

TABLE 9.—EFFECT OF SMA/NTA RATIO ON SCALE PREVENTION AT 900 p.s.i. WITHOUT PHOSPHATE

| SMA, p.p.m. | NTA (Na₃), p.p.m. | Percent scale prevention |
|---|---|---|
| 0.45 | 0.45 | 55 |
| 0.9 | 0.9 | 65 |
| 1.0 |  | 45 |
| 1.0 | 4.0 | 70 |
| 1.35 | 1.35 | 60 |
| 2.0 |  | 60 |
| 2.5 | 2.5 | 85 |
| 3.1 | 9.1 | 90 |
| 3.2 | 5.8 | 85 |
| 4.0 | 1.0 | 80 |
| 4.0 | 16 | 90 |
| 5.0 |  | 85 |
| 5.8 | 3.2 | 85 |
| 5.8 | 10.7 | 90 |
| 6.25 | 6.25 | 95 |
| 10 | 10 | 90 |
| 10 | 10 | 90 [1] |
| 10.7 | 5.8 | 90 |
| 12.5 |  | 80 |
|  | 12.5 | 65 |
|  | 20 | 80 |
|  | 40 | 95 |

[1] Duplicate test.

Another advantage of the invention resides in the fact that the composition show activity over a wide variety of alkalinity present in boiler water. To illustrate this effect, Table 10 is presented below. The treatment used was the styrene-maleic acid sodium salt polymer of Example I and NTA (Na)₃ in a 1:1 weight ratio.

TABLE 10.—EFFECT OF ALKALINITY

| Material | Avg. BW M-Alk., p.p.m. | Avg. BW PO₄, p.p.m. | Percent scale prevention |
|---|---|---|---|
| Amount, p.p.m.: |  |  |  |
| 16.6  SMA-NTA(Na)₃ 1:1 | 392 | 60 | 80 |
| 16.6  SMA-NTA(Na)₃ 1:1 | 184 | 58 | 75 |
| 16.6  SMA-NTA(Na)₃ 1:1 | 84 | 51 | 65 |

Table 11 is presented below to illustrate the fact that the polymers cooperate to improve the effectiveness of nitrilo trimethyl phosphonic acid, NTP.

TABLE 11.—EFFECT OF NTP AND SMA FOR PREVENTION OF MIXED PHOSPHATE SCALE

| SMA amt., p.p.m. | NTP amt., p.p.m. | Percent scale prevention |
|---|---|---|
| 4.0 | 0 | 75 |
| 4.0 | 0.75 | 90 |
| 4.0 | 1.5 | 95 |
| 4.0 | 3.0 | 95 |

As indicated, it is sometimes desirable to incorporate with the compositions of the invention molecularly dehydrated phosphates such as the well-known tripolyphosphates, the pyrophosphates and the metaphosphates. These phosphates provide an analytical control for purposes of maintaining the dosage level at a desired rate within the boiler. Also they allow smaller quantities of chemical to be used and convert any scale formed to a more desirable species. Thus, by using simple known phosphate determinations it is possible to monitor the amount of nitrilo compound and polar polymer in the system during the course of treatment.

Typical formulas that have proven successful under a wide variety of field conditions are presented below by way of illustration:

Composition A

Ingredient: Percent by wt.
Sodium tripolyphosphate _____ 50.0
Antifoam (80% soda ash carrier) [1] _____ 20.0
NTANa₃H₂O _____ 7.5
SMA _____ 22.5

[1] Mixed polyoxyethylene polyoxypropylene glycols—see U.S. 2,575,298.

Composition B

Ingredient: Percent by wt.
Sodium tripolyphosphate _____ 65.0
Antifoam (80% soda ash carrier) [1] _____ 15.0
SMA _____ 15.0
NTANa₃H₂O _____ 5.0

[1] Mixed polyoxyethylene polyoxypropylene glycols—see U.S. 2,575,298.

The above formulas when used in treating boilers are convenient in that they provide a substitute for multicomponent additives frequently used in boiler treating practice.

Many evaluations have shown that when phosphate is present in the boiler water that it tends to form with the calcium present, calcium phosphate rather than calcium sulphate which is more readily acted upon by the compositions of the invention. When used as a control for maintaining dosages, it is convenient to vary the phosphate level in relation to the operating pressure of a given boiler and also in relation to the hydroxide alkalinity of the boiler water. A convenient guide for maintaining dosages of the compositions in a boiler water as well as providing an adequate phosphate reserve to insure against calcium sulphate formation, Table 12 is presented below.

TABLE 12

| Boiler pressure, p.s.i.: | PO₄ residual, p.p.m. | Hydroxide alkalinity, p.p.m. |
| --- | --- | --- |
| Less than 300 | 15-25 | 150-200 |
| 300-450 | 15-25 | 125-150 |
| 450-900 | 15-25 | 80-100 |
| 900-1200 | 10-20 | 50-75 |

It will be understood that the compositions of the invention need not contain phosphates although it is a desirable commercial feature. In some instances the phosphate component may be added separately to provide a minimum phosphate dosage of at least 5 p.p.m. in the boiler water.

Compositions of the invention are designed to eliminate the use of such well-known boiler treating materials such as lignins and tannins. The composition of the inventions are capable of acting upon such difficult scales such as iron oxides, alkaline earth metal silicates and insoluble magnesium salt. Also, under conditions of extended use the compositions of the invention have shown the capability of slowly and safely removing excess scale deposits commonly found on heat exchange surfaces of large industrial boilers.

In its broadest aspects the invention contemplates using as a material related to the nitrilo compounds all amino carboxylate chelate compounds with a preferred group being represented by the alkali metal salts of ethylene diamine tetra acetic acid (EDTANa₄). Materials of this type may be combined to provide 10-90% by weight of themselves with 10-90% by weight of the water soluble sulfoxy-free polar addition polymer.

Illustrative of the effectiveness of such treatments is illustrated below in Example III.

Example III

When 54 p.p.m. of a mixture of 85% EDTANa₄2H₂O and 15% spray dried styrene maleic anhydride as per Example I was used to treat the feed water of a research boiler test which contained 10 p.p.m. magnesium hardness and phosphate to produce a residual of 3 p.p.m., the result was 95% prevention of the magnesium phosphate scale at 800 p.s.i. This result is a definite improvement over the 70% and 75% scale prevention obtained when these treatments are used individually at similar dosages. At 26 p.p.m., the above mixture prevented 65% of the potential magnesium phosphate scale.

The expression "sulfoxy-free" as used with respect to the polymers is intended to describe polymers which do not contain polar groups containing sulphur and oxygen and which are not anionic in nature. Such should not be present in the polymers used herein to an extent greater than 10% by weight. They should not be the only polar grouping in the polymer. Illustrative of a nonoperative polymer is a polystyrene sulfonic acid.

I claim:
1. A method for inhibiting and removing scale in boilers used to generate steam from water which has a tendency to form scale comprising incorporating with the water from which steam is generated under a pressure of at least 15 p.s.i. a quantity of a composition sufficient to accomplish said inhibition and removal of said composition comprising from 10-90% by weight of:
    (A) a nitrilo compound having the structural formula of

$$N(-(CH_2-)_x-Q)_3$$

where $x$ is an integer of from 1-2 and Q is a radical from the group consisting of

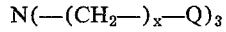

where R is a radical from the group consisting of hydrogen alkali metal and ammonium with at least 2 occurrences of R being alkali metal or ammonium:

and 90-10% of:
    (B) a water soluble sulfoxy free polar addition polymer having a molecular weight of at least 1,000 and boiling the water.

2. The method of claim 1 where:
    (A) is a nitrilo carboxylic compound of the structural formula $$N(-(CH_2-)_x-COOR)_3$$

where $x$ is an integer of from 1-2 and R is a radical from the group consisting of hydrogen alkali metal and ammonium with at least one occurrence of R being an alkali metal or ammonium radical, and where:
    (B) is a water soluble anionic polar vinyl addition polymer having in its structure at least 5% by weight of hydrophilic side chain groups from the group consisting of carboxylic acid, carboxylic acid anhydride, carboxylic acid salts, carboxylic acid esters, carboxylic acid amides, and hydroxyl groups.

3. The method of claim 2 where the water soluble anionic polar vinyl addition polymer is a maleic anhydride polymer.

4. The method of claim 3 where the maleic anhydride polymer is a maleic anhydride copolymer which has been hydrolized to the maleic acid salt form.

5. The method of claim 3 where the maleic anhydride polymer is a maleic anhydride-styrene copolymer.

6. The method of claim 2 where the water soluble anionic polar vinyl addition polymer is an acrylic acid polymer.

7. The method of claim 5 where the acrylic acid polymer has been prepared by the alkylene hydrolysis of polyacrylonitrile.

8. The method of claim 1 wherein the nitrilo compound is nitrilotriacetic acid and the water soluble sulfoxy free polar addition polymer is a styrene-maleic anhydride copolymer.

9. The composition according to claim 8 wherein the composition is utilized in dosages varying between about 1-100 p.p.m.

10. A composition according to claim 8 wherein the nitrilotriacetic acid is utilized in a weight percent of 20-80% and the styrene-maleic anhydride copolymer is utilized in the weight percent of 80-20% and the boiler pressure generating steam is operated at a pressure of from about 15 p.s.i. to 1200 p.s.i.

11. A method of inhibiting and removing scale in boilers used to generate steam from water which has a tendency to form scale which comprises incorporating with said water from which steam is generated under a pressure of from 15 p.s.i. to about 1200 p.s.i. a quantity of a composition sufficient to accomplish said inhibition and removal comprising 20-80% of:
    (A) a nitrilo carboxylic compound of the structural formula $$N(-(CH_2-)_x-COOR)_3$$

where $x$ is an integer of from 1-2 and R is a radical from the group consisting of hydrogen alkali metal and ammonium with at least one occurrence of R being an alkali metal or ammonium radical and 80-20% of:
    (B) a water soluble sulfoxy free polar vinyl addition polymer having a molecular weight of at least 1,000 and having in its structure at least 5% by weight of hydrophilic side chain groups from the group consisting of carboxylic acid, carboxylic acid anhydride, carboxylic acid salts, carboxylic acid esters and carboxylic acid amides
    (C) maintaining within said water a phosphate residual of at least 5 p.p.m.:
and boiling the water.

12. A method of inhibiting and removing scale in boilers used to generate steam from water which has a tendency to form scale comprising incorporating with the water from which steam is generated under a pressure of at least 15 p.s.i. a quantity of a composition sufficient to accomplish said inhibition and removal said composition comprising from 10–90% by weight of:

(A) a nitrilo phosphonic acid of the structural formulation of

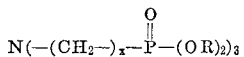

where $x$ is an integer of from 1–2 and R is a radical from the group consisting of hydrogen, alkali metal and ammonium with at least 2 occurrrences of R being alkali metal or ammonium, and 90–10% of:

(B) a water soluble sulfoxy free polar vinyl addition polymer having a molecular weight of at least 1,000 and having in its structure at least 5% by weight of hydrophilic side chain groups from the group consisting of carboxylic acid, carboxylic acid anhydride, carboxylic acid salts, carboxylic acid esters and carboxylic acid amides, and boiling the water.

13. The method of claim 12 where the nitrilo phosphonic acid compound is the trisodium salt of nitrilo trimethyl phosphonic acid.

14. A method of inhibiting and removing scale formation in boilers in the generation of steam from water which has a tendency to form scale which comprises the steps of operating said boiler at a pH within the range of 9–12, maintaining a phosphate residual within said boiler in accordance with the following conditions:

| Boiler pressure, p.s.i.: | PO₄ residual, p.p.m. | Hydroxide alkalinity, p.p.m. |
|---|---|---|
| Less than 300 | 15–25 | 150–200 |
| 300–450 | 15–25 | 125–150 |
| 450–900 | 15–25 | 80–100 |
| 900–1,200 | 10–20 | 50–75 | and incorporating with said water 0.1 to 1000 p.p.m. of a composition comprising from 10–90% by weight of:

(A) a nitrilo carboxylic compound of the structural formula

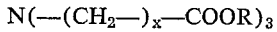

where $x$ is an integer of from 1–2 and R is radical from the group consisting of hydrogen alkali metal and ammonium with at least one occurrence of R being an alkali metal or ammonium radical and from 90–10% by weight of:

(B) a water soluble anionic polar vinyl addition polymer having a molecular weight of at least 1,000 and having in its structure at least 5% by weight of hydrophilic side chain groups from the group consisting of carboxylic acid, carboxylic acid anhydride, carboxylic acid salts, carboxylic acid esters and carboxylic acid amides, and boiling the water.

15. A method for inhibiting and removing scale in boilers used to generate steam from water which has a tendency to form scale comprising incorporating with the water from which steam is generated under a pressure of at least 15 p.s.i. a quantity of a composition sufficient to accomplish said inhibition and removal said composition comprising from 10–90% by weight of:

(A) an amino carboxylate chelate compound and from 90–10% of (B) a water soluble sulfoxy free polar addition polymer having a molecular weight of at least 1,000 and boiling the water.

16. The method of claim 15 where the amino carboxylate chelate compound is an ethylene diamine tetra acetic acid compound.

References Cited

UNITED STATES PATENTS

| | | | |
|---|---|---|---|
| 2,396,938 | 3/1946 | Bersworth | 134—2 |
| 2,723,956 | 11/1955 | Johnson | 252—180 |
| 2,783,200 | 2/1957 | Crum et al. | 210—23 |
| 2,980,610 | 4/1961 | Ruehrwein | 252—180 |
| 3,296,027 | 1/1967 | Jacklin | 252—180X |
| 3,308,065 | 3/1967 | Lesinski | 252—82 |
| 3,331,773 | 7/1967 | Gunderson et al. | 252—82X |
| 3,438,811 | 4/1969 | Harriman et al. | 252—156 |

JOHN T. GOOLKASIAN, Primary Examiner

M. E. McCAMISH, Assistant Examiner

U.S. Cl. X.R.

134—2, 3, 41; 210—58; 252—180